(No Model.) 2 Sheets—Sheet 1.

C. C. REDMOND & A. W. WHITE.
Beer Faucet.

No. 229,637. Patented July 6, 1880.

Attest:
T. Walter Fowler,
W. H. Morsell

Inventors:
Chas. C. Redmond
Archibald W. White
pr atty,
A. H. Evans & Co.

N. PETERS, PHOTO-LITHOGRAPHER, WASHINGTON, D. C.

(No Model.) 2 Sheets—Sheet 2.

C. C. REDMOND & A. W. WHITE.
Beer Faucet.

No. 229,637. Patented July 6, 1880.

Attest;
J. Walter Fowler,
W. H. Morsell,

Inventors;
Chas. C. Redmond
Archibald W. White
per atty
A. H. Evans & Co.

UNITED STATES PATENT OFFICE.

CHARLES C. REDMOND AND ARCHIBALD W. WHITE, OF SAN JOSÉ, CAL.

BEER-FAUCET.

SPECIFICATION forming part of Letters Patent No. 229,637, dated July 6, 1880.

Application filed March 22, 1880. (No model.)

*To all whom it may concern:*

Be it known that we, CHAS. C. REDMOND and ARCHIBALD W. WHITE, both of San José, State of California, have invented certain new and useful Improvements in Beer-Faucets; and we hereby declare the following to be a full, clear, and exact description thereof, reference being had to the accompanying drawings, making part of this specification, and in which—

Figure 1:
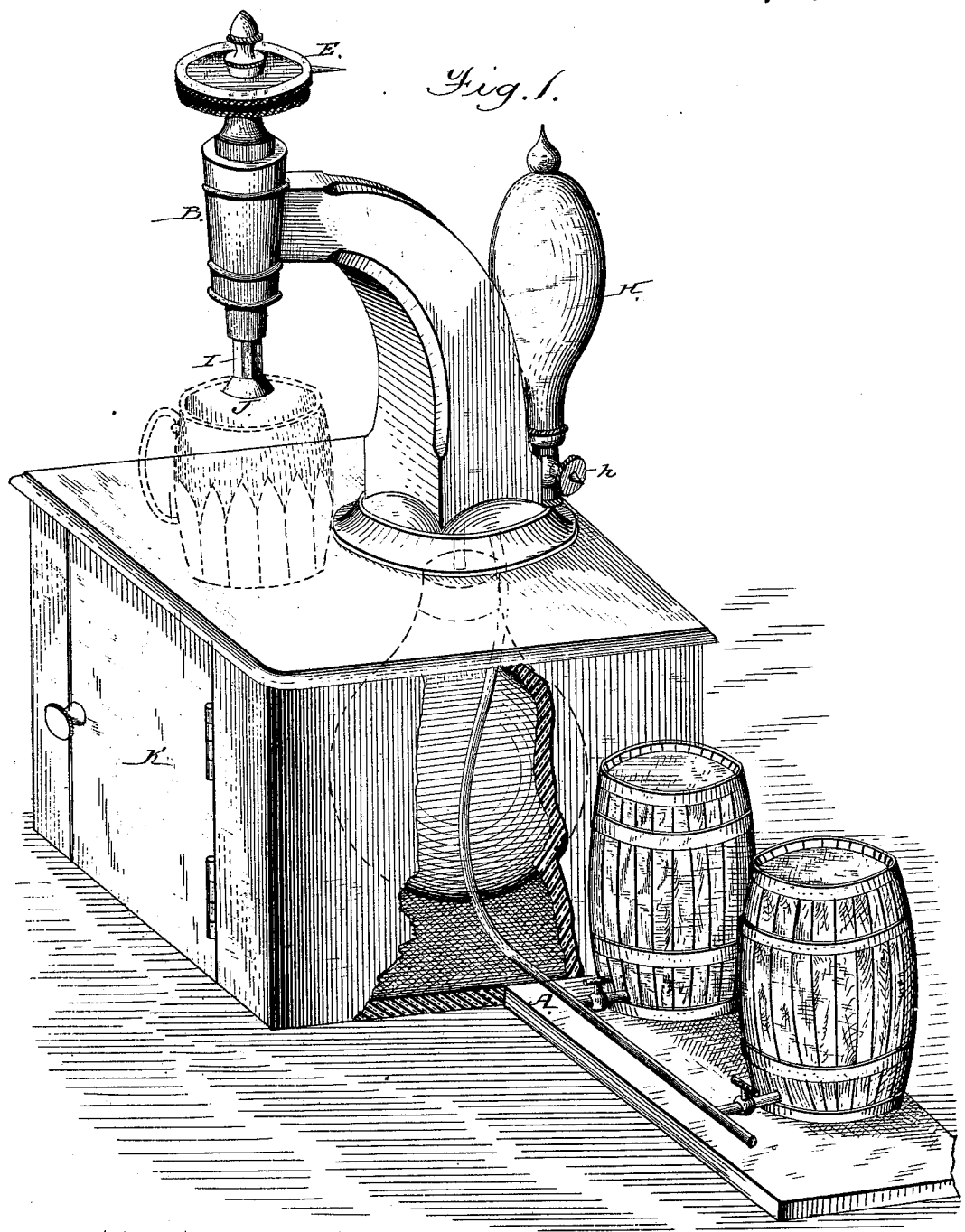
Figure 2:
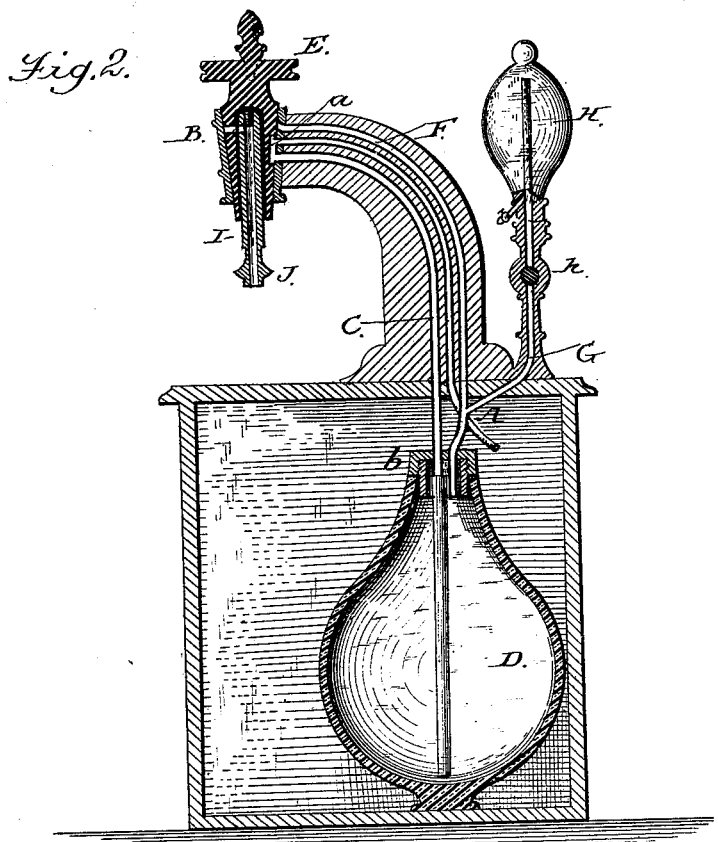
Figure 3:
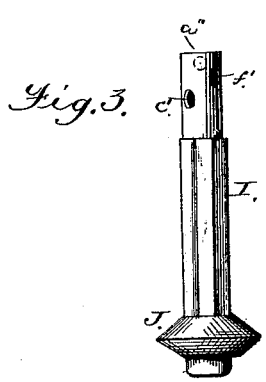
Figure 4:
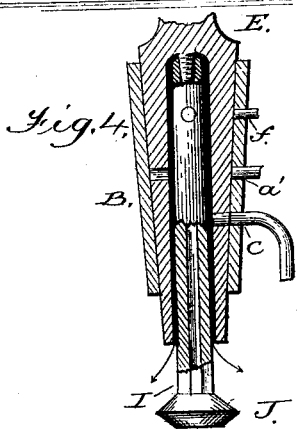

Figure 1 is a perspective view of our invention. Fig. 2 is a vertical section of the same. Figs. 3 and 4 are details to be referred to.

The object of our invention is to supply a faucet whereby a glass of beer or other fermenting liquor may be drawn without having the glass partially filled with foam, as is the case with faucets generally in use, and without passing air into the cask or allowing gas to escape, thereby keeping the beer good and under pressure until the contents of the cask are used up; and it consists of the combination of devices hereinafter described and claimed, and is an improvement on Letters Patent No. 224,345, dated February 10, 1880.

To enable others skilled in the art to make and use our invention, we will proceed to describe the exact manner in which we have carried it out.

In the drawings, A represents the pipe leading from the beer-cask to the faucet B, and C represents the pipe leading from the faucet into the globe D. These two pipes are connected by means of a groove, $a$, made longitudinally in the plug E.

The pipe F leads from the globe D to the faucet B, with a branch, G, leading to a gas-reservoir, H; and the plug E, besides being provided with the groove $a$, has openings $a'$, $c$, and $f$, so disposed as to gage accurately with the pipes A, C, and F, so that by turning the plug E the openings $a'$, $c$, or $f$, or the groove $a$, may be alternately brought opposite to its corresponding pipe, (by reason of the respective openings being in different vertical planes,) and beer may be drawn either directly from the cask through pipe A, by bringing the opening $a'$ opposite the pipe A, or from the globe through pipe C, by bringing the opening $c$ opposite the pipe C; or gas may be drawn from the reservoir H, when desired, through the pipe F by bringing the opening $f$ opposite the pipe F. Within the plug E is fitted the hollow stem I, also provided with holes corresponding with holes $a''$, $c'$, and $f'$ in the plug. The lower portion of this stem is made polygonal, extending down to a flaring apron, J, as shown in Fig. 3, for a purpose hereinafter explained. The upper and round portion of the stem is of a diameter something less than the interior drain of the plug. In the upper end of this stem is a female screw fitted over a short screw in the upper portion of the hollow part of the plug, by which means the stem is held in position, and is capable of being turned in the plug and independent of the plug, so as to throw the openings $a''$, $c'$, and $f'$ out of register with the holes in the plug, and of course out of register with the pipes A, C, and F, and cause the beer to flow down outside of the stem until it strikes the flaring apron J, whereby it is passed in the form of a thin film into the glass, carrying with it a portion of the air caught beneath the film, thereby giving additional "life" to the beer.

The operation of our faucet is as follows: The spigot at the cask being opened, the beer flows through pipe A, groove $a$, (which is made to register with pipes A and C,) and pipe C into the bottom of globe D. The gas of the beer, rising in the top of the globe and a portion of it passing through pipe G, fills the reservoir H. After the globe is filled, stop the spigot at the cask, open the faucet B, and bring the opening $c$ opposite the pipe C. The pressure of the gas in the top of the globe D will force the beer back through the pipe C and through the faucet B into the glass.

If it be desirable to add more gas to the beer, it will only be necessary to give a slight turn to the plug E, so as to bring the opening $f$ opposite the pipe F, and open the cock $h$, by which means gas is allowed to escape from the reservoir H through the faucet into the glass.

When it is desired to add more "life" to the beer without increasing the gas, it is only necessary to give a slight turn to the stem I by taking hold of its lower end and close openings $a''$, $c'$, and $f'$, when the beer will strike against the stem, pass down on the outside, and shed itself, as before described, carrying with it a portion of the air caught beneath the film, thereby giving additional life to the beer.

The cabinet K is designed for the protection of the globe D, and may be utilized as a cooling-chamber for the beer.

Having thus described our invention, we claim as new and desire to secure by Letters Patent—

1. The globe D and pipes A and C, in combination with the faucet B, provided with plug E, having the holes $a'$ and $c$, and groove $a$, substantially as and for the purpose set forth.

2. The globe D and pipes A C, in combination with the pipes F G, gas-reservoir H, faucet B, provided with plug E, having the holes $a'$, $c$, and $f$, substantially as and for the purpose set forth.

3. The faucet B, provided with plug E, having the groove $a$, and holes $a'$, $c$, and $f$, in combination with the hollow polygonal stem I, provided with the flaring apron J, substantially as and for the purpose set forth.

CHARLES C. REDMOND.
ARCHIBALD W. WHITE.

Witnesses:
J. E. BROWN,
E. L. SNELL.